United States Patent
Narayanan et al.

(10) Patent No.: US 7,795,551 B2
(45) Date of Patent: Sep. 14, 2010

(54) RACKING OF ELECTRICAL DISTRIBUTION DEVICES

(75) Inventors: Janakiraman Narayanan, Andra Pradesh (IN); Yatin Vilas Newase, Maharashtra (IN); Partha Sarathy Doddapadam Srinivasa Raghavachar, Karnataka (IN); Soundararajan Narayanasamy, Hyderabad (IN); Mahesh Jaywant Rane, Secunderabad (IN)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 12/103,057

(22) Filed: Apr. 15, 2008

(65) Prior Publication Data
US 2009/0258527 A1 Oct. 15, 2009

(51) Int. Cl.
*H01H 1/50* (2006.01)
(52) U.S. Cl. ............... 200/255; 200/50.27; 439/251
(58) Field of Classification Search ... 200/50.21–50.27, 200/254, 255, 256; 439/251
See application file for complete search history.

(56) References Cited
U.S. PATENT DOCUMENTS
3,381,105 A 4/1968 Mortenson
3,427,419 A 2/1969 Findley, Jr.
4,655,538 A * 4/1987 Eguchi et al. ............... 439/820

FOREIGN PATENT DOCUMENTS
| AT | 6765 U1 | 3/2004 |
| DE | 3913846 A1 | 10/1990 |
| GB | 211366 A | 2/1924 |

OTHER PUBLICATIONS

European Patent Application No. 09157026.7-1231: European Search Report and European Search Opinion, completed Jun. 26, 2009.

* cited by examiner

*Primary Examiner*—Ross N Gushi
(74) *Attorney, Agent, or Firm*—Global Patent Operation; Stephen G. Midgley

(57) ABSTRACT

An electrical distribution apparatus includes a fixed terminal, at least two fingers attached at respective pivot points in the apparatus, and a mechanical spring in operative communication with the at least two fingers, configured to provide tension upon separation of the at least two fingers. According to the apparatus, the at least two fingers are of a different length, length is a measure of the distance from a pivot point of a finger to an end of the finger, and the respective pivot points are each formed between the fixed terminal and each of the two fingers.

16 Claims, 4 Drawing Sheets

(VIEW A)

(VIEW B)

RACKING OF ELECTRICAL DISTRIBUTION DEVICES

BACKGROUND OF THE INVENTION

Embodiments of the invention generally relate to electrical distribution devices, and more particularly to racking of electrical distribution devices, for example, circuit breakers.

Conventional electrical distribution equipment generally includes one or more circuit breakers, and often includes a plurality of circuit breakers housed in drawout units in switchgear housings and other electrical equipment. Periodically, the circuit breaker drawout units require removal to facilitate maintenance and or replacement of the associated switching devices. Similarly, additional switching devices may be placed within the drawout units. In order to facilitate placement of additional devices and/or removal of existing devices, the circuit breaker is "racked in" or "racked out," respectively.

In general, a typical circuit breaker may be connected to the external power source through disconnects termed primary disconnects. The primary disconnects aid in connecting the circuit breaker to external power. The primary disconnects further aid the circuit breaker in being disconnected from the external power for maintenance or test procedures. Primary disconnects may also be termed clusters Typical circuit breakers have three positions. The first position is a "connected position" in which primary and secondary disconnects of the circuit breaker are connected to a circuit. The second position is a "disconnected position" in which the primary and secondary disconnects are disconnected. The third position is a "test position," in which the primary disconnects are disconnected but the secondary disconnects are connected. The test position allows a user, for example, to check the functioning of secondary or control power. Breakers may be racked between these three positions. If racking in, the breaker is moved from the disconnected position, through the test position, into the connected position. If racking out, the breaker is moved from the connected position, through the test position, into the disconnected position.

A racking mechanism is included in conjunction with the circuit breaker, such as a racking shaft, that allows for rotation of the mechanism to move the circuit breaker into the connected position. Furthermore, if a plurality of circuit breakers are included in a drawout box, additional racking mechanisms are used. It follows that as the number of primary disconnects or clusters increases, the force required for circuit breaker insertion/removal increases substantially. Thus, if more circuit breakers, or even larger circuit breakers, with differing current limiting requirements and/or thermal requirements are necessary for an application, breaker insertion/removal may be hindered due to large racking forces.

BRIEF DESCRIPTION OF THE INVENTION

An embodiment of the invention includes an electrical distribution apparatus. The apparatus includes a fixed terminal, at least two fingers attached at respective pivot points in the apparatus, and a mechanical spring in operative communication with the at least two fingers, configured to provide tension upon separation of the at least two fingers. According to the apparatus, the at least two fingers are of a different length, length is a measure of the distance from a pivot point of a finger to an end of the finger, and the respective pivot points are each formed between the fixed terminal and each of the two fingers.

Another embodiment of the invention includes an electrical distribution system. The system includes at least one electrical distribution apparatus and at least one terminal length arranged along a length or width of a footprint of an electrical distribution device configured as a fixed terminal. The apparatus includes the fixed terminal, at least two fingers attached at respective pivot points in the apparatus, and a mechanical spring in operative communication with the at least two fingers, configured to provide tension upon separation of the at least two fingers. According to the apparatus, the at least two fingers are of a different length, length is a measure of the distance from a pivot point of a finger to an end of the finger, and the respective pivot points are each formed between the fixed terminal and each of the two fingers. Furthermore, the at least one terminal length is in operative communication with the fingers of the apparatus between the pivot points.

Another embodiment of the invention includes an electrical distribution system. The system includes a plurality of electrical distribution apparatuses, and at least one terminal length arranged along a length or width of a footprint of an electrical distribution device configured as a fixed terminal. The apparatuses include the fixed terminal, at least two fingers attached at respective pivot points in the apparatus, and a mechanical spring in operative communication with the at least two fingers, configured to provide tension upon separation of the at least two fingers. According to the apparatus, the at least two fingers are of a different length, length is a measure of the distance from a pivot point of a finger to an end of the finger, and the respective pivot points are each formed between the fixed terminal and each of the two fingers. Furthermore, the at least one terminal length is in operative communication with each of the plurality of fingers of the apparatuses between the pivot points.

BRIEF DESCRIPTION OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION OF THE INVENTION

Figure 1:
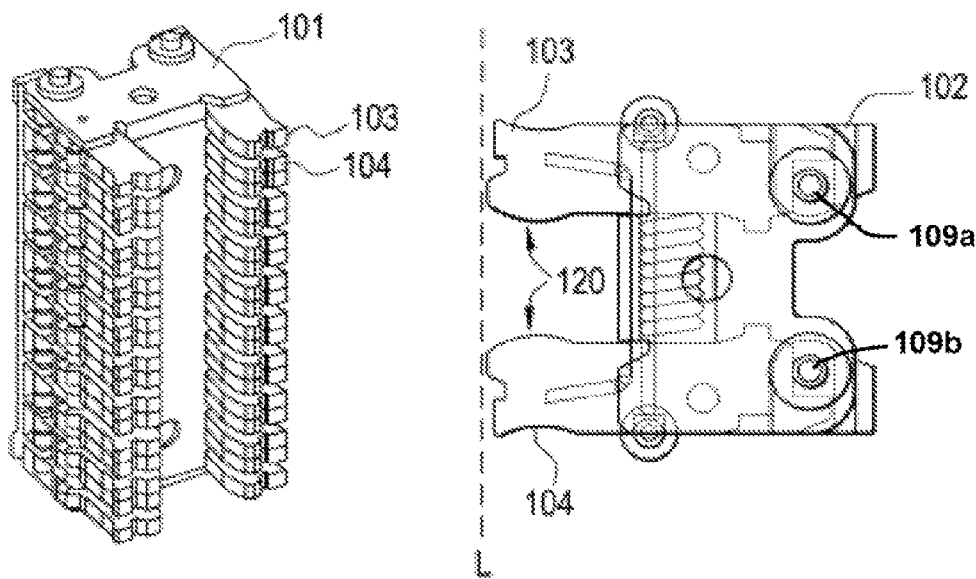
FIG. 1 illustrates diagrams of electrical distribution systems, according to example embodiments.
Figure 1:
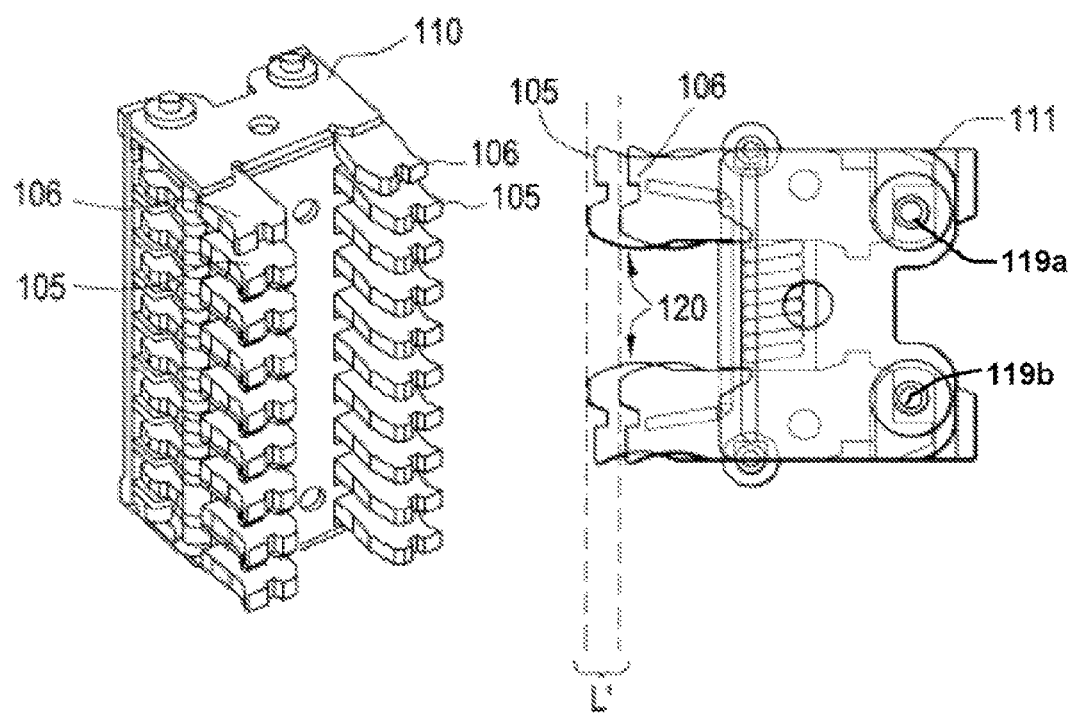

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. According to example embodiments, electrical distribution systems are provided which decrease the racking force of electrical distribution devices such as, for example, circuit breakers. The electrical distribution system includes multiple "fingers" for device racking. Each finger may be of a different length of an adjoining finger to reduce racking force of a device. The entry profile of the each finger may also be formed reduce racking force. Furthermore, the inclusion of multiple fingers allows for devices of different lengths and different frame sizes. The multiple finger assemblies may be staggered vertically or horizontally, in either coordinate axis direction, within a footprint of a device for relatively better thermal performance.

Turning to FIG. 1, electrical distribution systems 101 and 110 are illustrated. System 101 is a simplified structure for illustration only. System 101 includes multiple assemblies of apparatuses 102. Each apparatus 102 includes fingers 103 and 104. The fingers 103 and 104 are of the same length, and have an inner curve 120, or profile, which is formed to reduce racking force. Insertion of a device and racking force is described in detail with reference to FIGS. 2 and 4.

System 110 is a simplified structure for illustration only as well. System 110 includes multiple assemblies of apparatuses 111. Each apparatus 111 includes fingers 105 and 106. The finger 105 is of a different length than finger 106. For example, as illustrated finger 105 is relatively greater in length than finger 106. Generally, a length difference of about ten percent (10%) to fifteen (15%) percent may be used according to some example embodiments. However, other example embodiments may includes greater difference in length or less difference in length, according to any particular implementation. As used herein, length may be a measure of length from a pivot point 109a, 109b, 119a, 119b to an end of the finger. The fingers 105 and 106 have an inner curve 120, or profile, which is formed to reduce racking force. Hereinafter, racking force and device insertion/removal is described with reference to FIG. 2.

Figure 2:
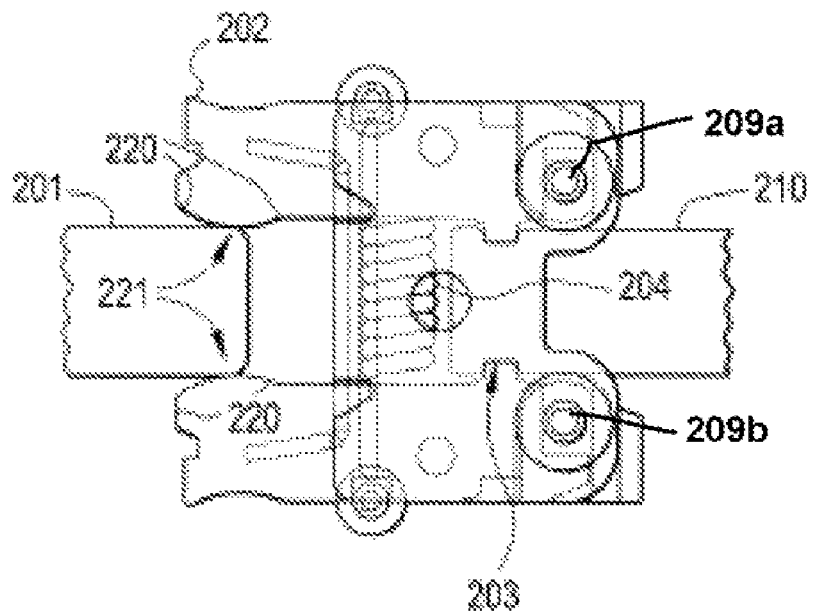
FIG. 2 illustrates a diagram of an electrical distribution system, according to an example embodiment.
Figure 2:
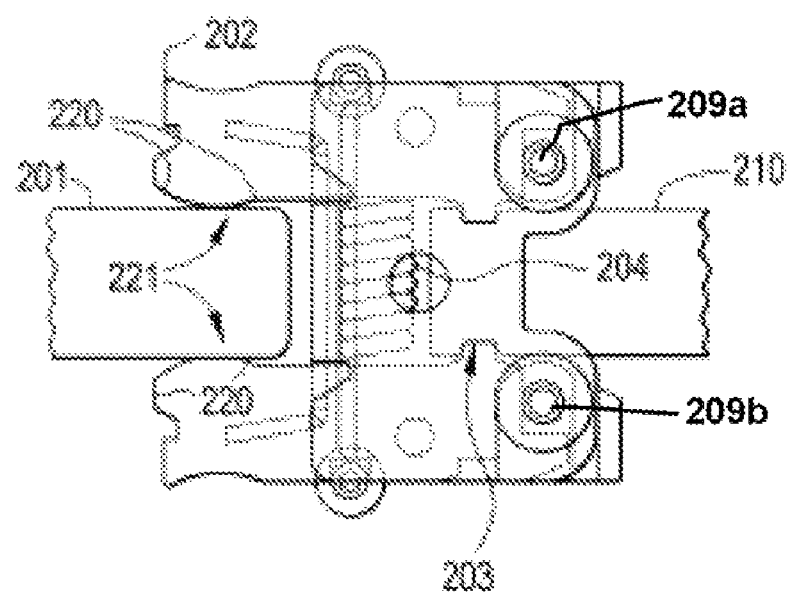

Turning to FIG. 2, an example electrical distribution system 210 is illustrated. FIG. 2 includes two (2) separate views of the system 210. In particular, VIEW A illustrates system 210 with a moving terminal 201 at an initial insertion of a device. VIEW B illustrates system 210 with a moving terminal 201 at an ending of an insertion of the same device.

Focusing on VIEW A, moving terminal 201 is at an initial insertion of the device. Moving terminal 201 engages the fingers 202 of the system 210, and would begin to separate the fingers 202 as the moving terminal 201 continues to be inserted. As the moving terminal 201 engages the fingers 202, the inner curve 220, or profile, of the fingers 202 direct the moving terminal 201 inward (or for example, towards the final insertion position of VIEW B). The fingers 202 further include locking profile 203.

The locking profile 203 (a recess in fixed terminal 210 and projection in the fingers 202) is used to arrest the movement of the fingers 202 in the horizontal axis (according to the arrangement of example FIG. 2) and allow the fingers 202 to pivot about the recess 203. Alternatively, the recess may be included in the fingers 202 and a projection may be included on the fixed terminal 210. These locking features are advantageous in that they provide a pivoting action without additional mechanisms such as pins or holes.

It follows that as the moving terminal 201 is inserted further into the system 210, the moving terminal separates the fingers 202 and pulls the spring 204. Thus, steady electrical contact between fingers 202 and moving terminal 201 is facilitated though continuous pressure provided with spring 204. Further, as fingers 202 and fixed terminal 210 are in electrical contact, upon insertion of moving terminal 201, electrical contact is established between moving terminal 201 and fixed terminal 210. It is noted that although a coil spring is illustrated, example embodiments are not so limited. For example, any suitable spring may be used between the fingers 202. For example, a leaf spring, cantilever spring, torsion spring, or any other suitable spring may be used. For example, if a torsion spring is used, it may be situated within pivot points 209a, 209b of the fingers 202.

It also follows that as the moving terminal 201 is inserted, friction resists the inward motion and the separation of the fingers 202 resists the inward motion, resulting in "racking force". However, as is readily apparent from the inner curve 220, the reduced surface contact area 221 provided by the inner curve 220 reduces the friction, and thus the racking force. Furthermore, the outer portion of the inner curve 220 steadily separates the fingers 202 during the insertion of the moving terminal 201, further reducing racking force. As described previously with reference to FIG. 1, multiple finger arrangements may be provided for accommodation of devices with larger footprints, greater current requirements, differing thermal requirements, and/or for any suitable purpose. Hereinafter, differing arrangements are discussed with reference to FIG. 3.

Figure 3:
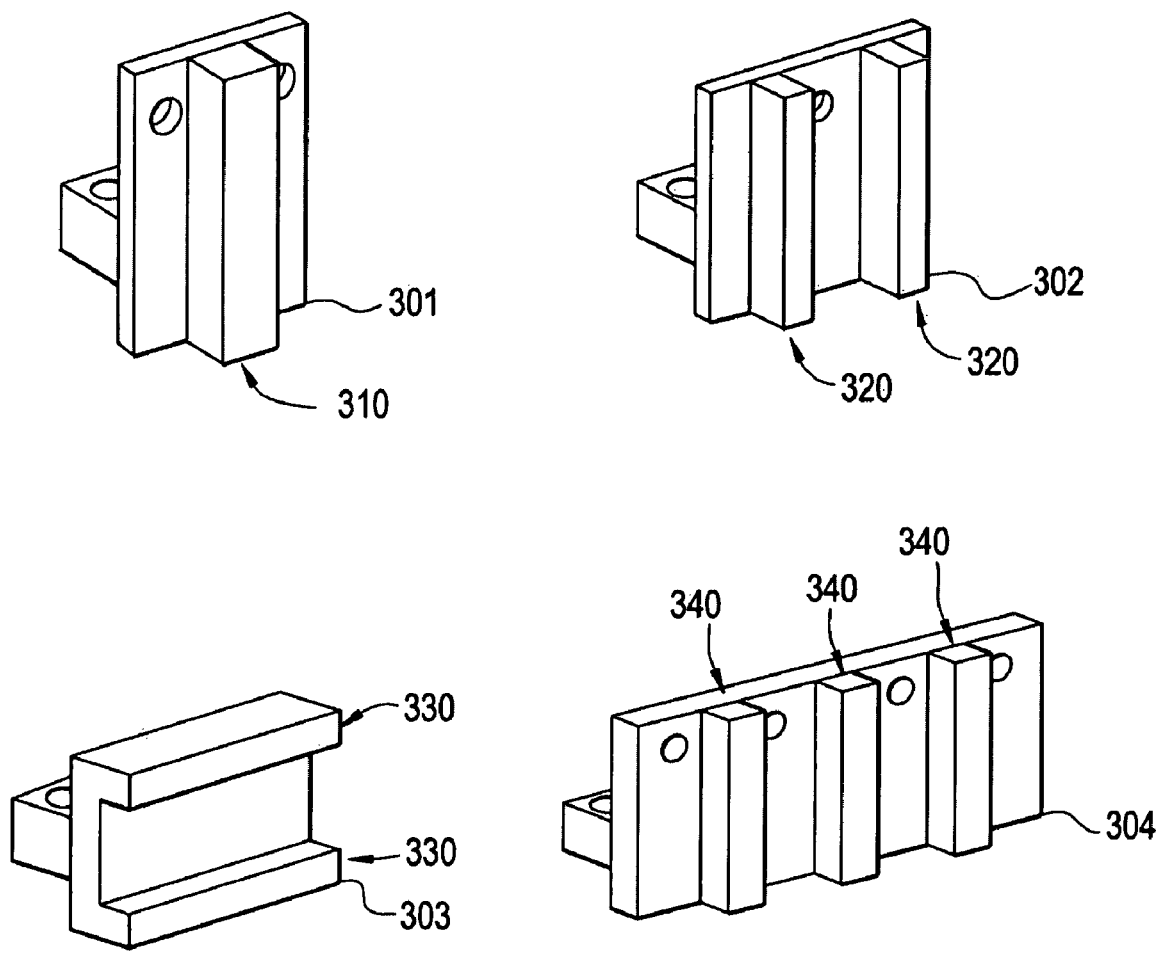
FIG. 3 illustrates examples of electrical distribution systems, according to example embodiments.

FIG. 3 illustrates examples of electrical distribution systems, according to example embodiments. For example, a system may be formed of a plurality of apparatuses (see FIG. 1) such that differing lengths of finger arrangements may be used for greater electrical contact surface area (which, for example, would increase thermal transfer contact area). System 301, for example, includes terminal 310 which extends vertically through the racking system 301. Terminal 310 may be considered either the moving terminal, or the fixed terminal, depending upon the orientation of the apparatus fingers. For example, with reference to FIG. 2, if the device includes the fixed terminal 202, it follows that terminal length 310 is the fixed terminal. Alternatively, if the device includes the moving terminal 201, it follows that the terminal length 310 is the moving terminal. Turning back to FIG. 3, the length of terminal 310 may be substantially the same length as the footprint of an electrical distribution device. Thus, an increased contact area may be facilitated through the greater length of the racking system 301 compared to conventional apparatuses. Furthermore, due to the increased contact area, greater thermal transfer may occur, resulting in the reduction of thermal issues. Moreover, the inner curve, or profile, of the apparatuses included in the system reduce the racking force apparent upon device insertion. Also, if fingers of differing lengths are also included, the racking force may be further reduced.

System 302, for example, includes terminals 320 which extend vertically through the system 302. Each of terminals 320 may be considered either the moving terminal, or the fixed terminal, depending upon the orientation of the apparatus fingers. For example, with reference to FIG. 2, if the device includes the fixed terminal 202, it follows that a terminal length of terminals 320 is the fixed terminal. Alternatively, if the device includes the moving terminal 201, it follows that the terminal length or terminal 320 is the moving terminal. Turning back to FIG. 3, the terminals 320 may be substantially the same length as the footprint of an electrical distribution device. Furthermore, terminals 320 may be spaced horizontally to encompass more surface area of the footprint of an electrical distribution device. Thus, an increased contact area may be facilitated through the greater length of the system 302 compared to conventional apparatuses. Furthermore, due to the increased contact area, greater thermal transfer may occur, resulting in the reduction of thermal issues. Moreover, the inner curve, or profile, of the apparatuses included in the system reduce the racking force apparent upon device insertion. Also, if fingers of differing lengths are also included, the racking force may be further reduced.

System 303, for example, includes terminals 330 which extend horizontally through the system 303. Each of terminals 330 may be considered either the moving terminal, or the fixed terminal, depending upon the orientation of the apparatus fingers. For example, with reference to FIG. 2, if the device includes the fixed terminal 202, it follows that a terminal length of terminals 330 is the fixed terminal. Alternatively, if the device includes the moving terminal 201, it follows that the terminal length or terminal 330 is the moving terminal. Turning back to FIG. 3, the terminals 330 may be substantially the same width as the footprint of an electrical distribution device. Furthermore, terminals 330 may be spaced vertically to encompass more surface area of the footprint of an electrical distribution device. Thus, an increased contact area may be facilitated through the greater width of the racking system 303 compared to conventional apparatuses. Furthermore, due to the increased contact area, greater thermal transfer may occur, resulting in the reduction of thermal issues. Moreover, the inner curve, or profile, of the apparatuses included in the system reduce the racking force apparent upon device insertion. Also, if fingers of differing lengths are also included, the racking force may be further reduced.

System 304, for example, includes terminals 340 which extend vertically through the system 304. Each of terminals 340 may be considered either the moving terminal, or the fixed terminal, depending upon the orientation of the apparatus fingers. For example, with reference to FIG. 2, if the device includes the fixed terminal 202, it follows that a terminal length of terminals 340 is the fixed terminal. Alternatively, if the device includes the moving terminal 201, it follows that the terminal length or terminal 340 is the moving terminal. Turning back to FIG. 3, the terminals 340 may be substantially the same length as the footprint of an electrical distribution device. Furthermore, terminals 340 may be spaced horizontally to encompass more surface area of the footprint of an electrical distribution device. Thus, an increased contact area may be facilitated through the greater length of the racking system 302 compared to conventional apparatuses. Furthermore, due to the increased contact area, greater thermal transfer may occur, resulting in the reduction of thermal issues. Moreover, the inner curve, or profile, of the device securing apparatuses included in the system reduce the racking force apparent upon device insertion. Also, if fingers of differing lengths are also included, the racking force may be further reduced.

Figure 4:
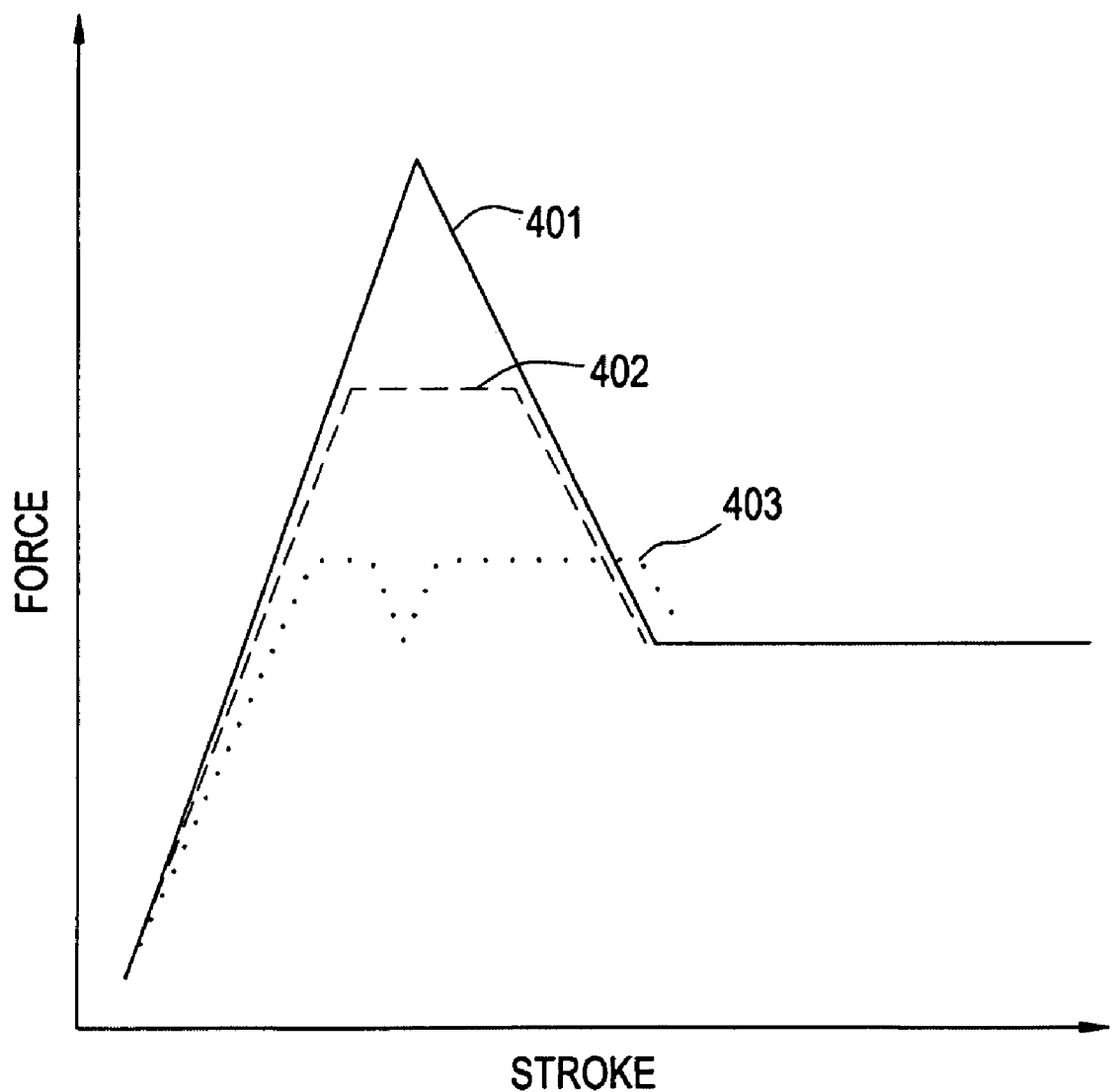
FIG. 4 is a graph depicting experimental results of racking forces of different electrical distribution systems.

Hereinafter, racking forces of different racking systems are compared using experimental results. FIG. 4 is a graph depicting experimental results of racking forces of different electrical distribution systems. The graph includes force curves 401, 402, and 403. The vertical axis of the graph represents a value of force, and the horizontal axis represents the inward stroke of device insertion. For example, the motion of the moving terminal as described with reference to FIG. 2. Force curve 401 is a solid line representing the racking force profile of a conventional racking system design. For example, a design which excludes any features as described herein or is otherwise considered conventional. The curve 401 includes a sharp peak toward the first third of the inward stroke of device insertion. This peak is the maximum racking force, and may hinder the ability for proper insertion of electrical distribution devices.

Force curve 402 is a dashed line representing the racking force profile of an example embodiment with a modified inner curve of device securing apparatus fingers. For example, a design which includes an inner curve of the fingers at least somewhat similar to curves 120 and 220 of FIGS. 1-2. The curve 402 includes a flattened peak toward the first third of the inward stroke of device insertion. This peak is the maximum racking force, and is of substantially reduced force compared to the conventional racking system curve 401. Thus, device insertion may be relatively easier, which may result in proper insertion of electrical distribution devices.

Force curve 403 is a dotted line representing the racking force profile of an example embodiment with a modified inner curve of device securing apparatus fingers, and including fingers of differing lengths. For example, a design which includes an inner curve of the fingers at least somewhat similar to curves 120 and 220 of FIGS. 1-2, and fingers of differing lengths as illustrated in FIG. 1. The curve 403 includes a flattened peak toward the first third of the inward stroke of device insertion with a local minimum along the flattened peak. The flattened peak is the maximum racking force, and is of substantially reduced force compared to the conventional racking system curve 401 and the force curve 402. Thus, device insertion may be relatively easier than previously described approaches, which may result in proper insertion of electrical distribution devices.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. An electrical distribution apparatus configured to operably connect to a first moving terminal, comprising:
   a fixed second terminal;
   a first pair of contact fingers operably connectable to said fixed terminal, each finger of said first pair of contact fingers comprising a first contact end and a second pivot end, each finger of said first pair of contact fingers being pivotable about a respective pivot point at each respective said second pivot end, and each said first contact end being disposed proximate to each other and configured to be elastically separable from each other;
   a second pair of contact fingers operably connectable to said fixed terminal, each finger of said second pair of contact fingers comprising a third contact end and a fourth pivot end, each finger of said second pair of contact fingers being pivotable about a respective pivot point at each respective said fourth pivot end, and each said third contact end being disposed proximate to each other and configured to be elastically separable from each other; wherein,
      said first pair of contact fingers are of a different length than said second pair of contact fingers, and
      length is a measure of a distance from said pivot point of a finger to said contact end of the respective finger.

2. The apparatus of claim 1, wherein each finger of said first pair of contact fingers comprises an inner surface configured with an inner curve.

3. The apparatus of claim 2, wherein each inner curve is configured to reduce a racking force upon an insertion of the first moving terminal between said first pair of contact fingers.

4. The apparatus of claim 3, wherein each inner curve is configured to engage with the first moving terminal such that an electrical distribution device is attached to the apparatus.

5. The apparatus of claim 1, wherein the length of said first pair of contact fingers differs from the length of said second pair of contact fingers within a range of ten percent to fifteen percent.

6. The apparatus of claim 1, further comprising:
   a mechanical spring in operative communication with said first pair of contact fingers and configured to provide a return force upon a separation of said first pair of contact fingers.

7. The apparatus of claim 6, wherein said mechanical spring is a coil spring, leaf spring, cantilever spring, or torsion spring.

8. The apparatus of claim 7, wherein said torsion spring is disposed between said pivot points of the fingers.

9. An electrical distribution system, comprising:
   at least one apparatus as defined in claim 1; and
   at least one terminal length arranged along a length or width of a footprint of an electrical distribution device configured as the second fixed terminal;
   wherein the at least one terminal length is in operative communication with said first pair and said second pair of contact fingers and disposed between the pivot points.

10. The system of claim 9, wherein said first pair of contact fingers and said second pair of contact fingers are of the same length.

11. An electrical distribution system, comprising:
    a plurality of apparatus as defined in claim 1; and
    at least one terminal length arranged along a length or width of a footprint of an electrical distribution device configured as the second fixed terminal for each of the plurality of apparatuses;
    wherein the at least one terminal length is in operative communication with said first pair and said second pair of contact fingers and disposed between the pivot points of said second pair of contact fingers.

12. The system of claim 11, wherein the said first pair and said second pair of contact fingers of each of the plurality of apparatuses are of the same length.

13. The electrical distribution system of claim 11, wherein each respective finger of said first pair and said second pair of contact fingers further comprises a respective protrusion; and
    said second fixed terminal further comprises at least two recesses, each of said at least two recesses configured to capture at least one said respective protrusion to arrest the movement of at least one said respective finger of said first pair and said second pair of contact fingers.

14. The electrical distribution system of claim 11 wherein each respective finger of said first pair and said second pair of contact fingers further comprises a respective recess; and
    said second fixed terminal further comprises at least two projections, each of said at least two projections configured to be captured by at least one said respective recess to arrest the movement of at least one said respective finger of said first pair and said second pair of contact fingers.

15. The electrical distribution apparatus of claim 1 wherein each respective finger of said first pair and said second pair of contact fingers further comprises a respective protrusion; and
    said second fixed terminal further comprises at least two recesses, each of said at least two recesses configured to capture at least one said respective protrusion to arrest the movement of at least one said respective finger of said first pair and said second pair of contact fingers.

16. The electrical distribution apparatus of claim 1 wherein each respective finger of said first pair and said second pair of contact fingers further comprises a respective recess; and
    said second fixed terminal further comprises at least two projections, each of said at least two projections configured to be captured by at least one said respective recess to arrest the movement of at least one said respective finger of said first pair and said second pair of contact fingers.

* * * * *